Figure 1:
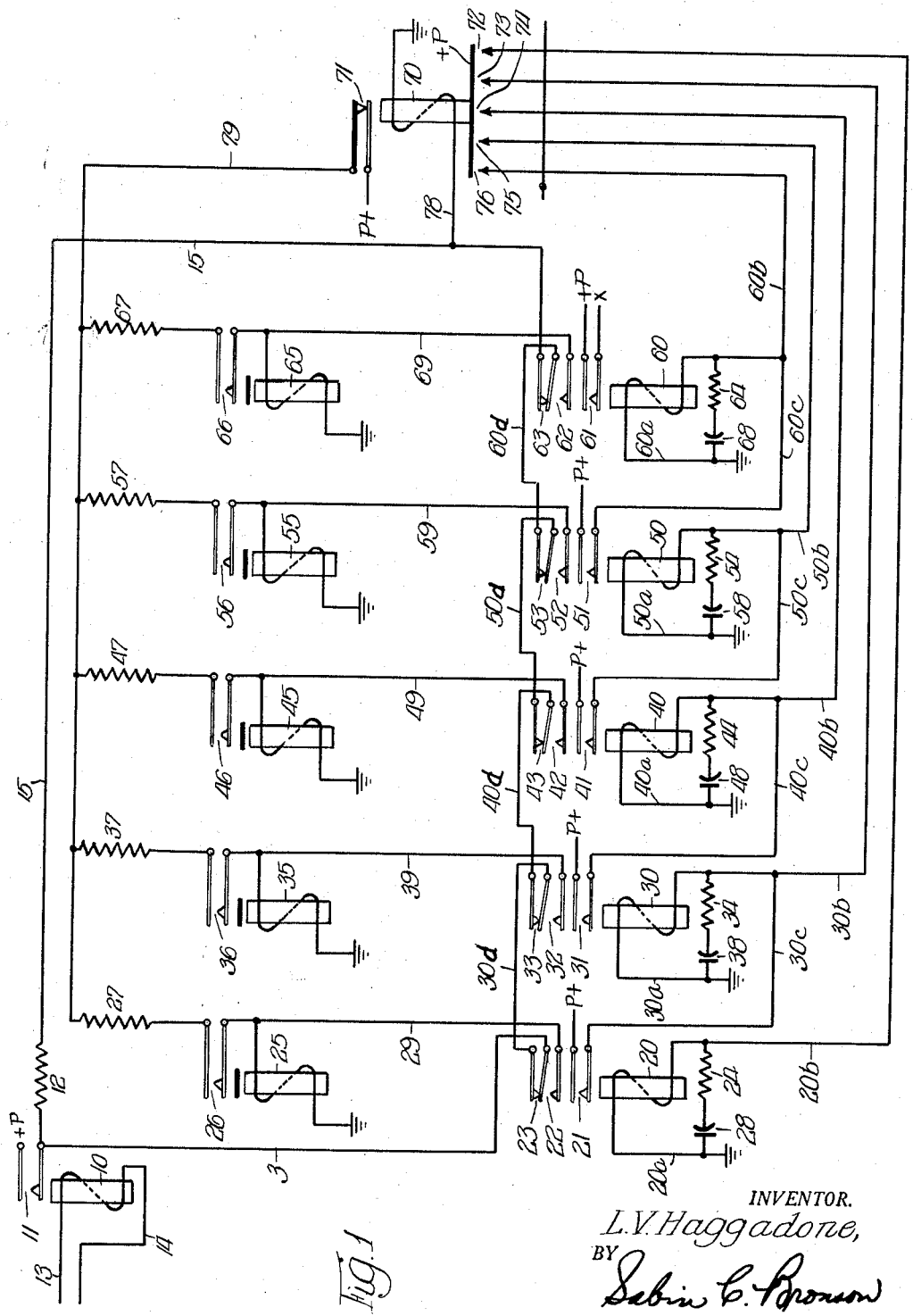

May 26, 1959  L. V. HAGGADONE  2,888,665
ELECTRICALLY OPERATED SELECTOR
Filed Nov. 8, 1954  2 Sheets-Sheet 1

INVENTOR.
L. V. Haggadone,
BY Sabin C. Bronson
Atty.

2,888,665
Patented May 26, 1959

2,888,665
ELECTRICALLY OPERATED SELECTOR

L. V. Haggadone, Chicago, Ill., assignor, by direct and mesne assignments, of fifty-one percent to Hardt Foundation, Chicago, Ill., a corporation of Illinois, and nine percent to Sabin C. Bronson, Hammond, Ind.

Application November 8, 1954, Serial No. 467,520

12 Claims. (340—168)

The present invention relates to an electrically operated selector for use in receiving electrical impulses containing intelligence at the receiving end of an electrical communication system or electric typewriter, or the like. More specifically it pertains to a new and improved apparatus receiving such impulses for subsequent recording by associated mechanical or electrical apparatus.

One of the objects of this invention is to provide a selector which is electrical in contradistinction to mechanical as in the prior art, thereby avoiding the use of mechanical parts which are subject to wear and breakage, necessitating expensive maintenance, and which introduce mechanical time lag in the operation of the selector.

Another object is to provide a selector that can be adapted to provide any one of a variety of signalling speeds, say, from 25 to 125 words per minute, thereby providing maximum utilization of transmission line time.

Since the selector has an inherent time base, it does not require complicated timing cams driven by electric motors which require delicate synchronization with the speed of motors on the transmitter. Gears, gear springs, cams, friction clutches and electric motors which are utilized in the conventional selector are eliminated in the present invention, thus allowing greater speed of operation with maximum dependability.

Since no moving parts used in this selector are subjected to friction, no lubrication will be necessary, thereby allowing the machine to be operated under temperature conditions which greatly exceed those under which existing machines can be operated.

By the elimination of the electric motor, drive mechanisms and cams, the overall weight and size of the present selector is greatly reduced, thereby providing greater portability.

Operating magnets used in the selector of the present invention being of maximum sensitivity, allows the selector to operate under severely distorted line characteristics. This selector and the machine with which it will operate, but which forms no part of the present invention, require no constant flow of current as does present apparatus, and hence, can be operated from a small source of power if necessary. This permits use of this selector in field applications where power generator availability is limited.

With the above and other apparent objects in view, the accompanying two drawings present circuit diagrams of two variations of the selector according to this invention and will serve to illustrate and explain the operation of this invention when considered in connection with the following description.

In Figure 1, relay 10 is a standard repeating relay which relays the incoming signal from conductors 13 and 14 to a chain of five relays, 20, 30, 40, 50 and 60, five magnets 25, 35, 45, 55 and 65 associated with said chain of relays and a sixth relay 70. All six relays have a so-called "fast make, slow break" characteristic, or in other words, they operate immediately upon energization, but experience a definite delay in opening or releasing after they have been de-energized. This delay characteristic may be produced by any well known method, such as design of core and armature to produce high magnetic retentivity or the use of shading coils on the core to accomplish the same purpose. In the circuit diagram this characteristic is obtained on the five chain relays by use of a resistance-capacitance combination connected in parallel with the relay coil. This resistance-capacitance combination will cause a slow discharge of the capacitor through the relay coil, thereby prolonging actual de-energization of the relay, after the energizing force has been removed.

The time delay of the release of the relay may be controlled by a variation of the size of the resistance and capacitance used in connection therewith, as will be readily understood.

Relays 20, 30, 40, 50 and 60 serve to complete a circuit and introduce a code signal to selector magnets 25, 35, 45, 55 and 65, respectively, at the proper time. Such a signal representing a letter of the alphabet under one form of the "Baudot" code system of Teletype transmisson consists of a marking condition, which is a condition of continuous current flow starting impulse which serves to effect in part synchronization of the machine, five intelligence impulses and a stop or mark impulse, which in conjunction with the starting impulse synchronizes the machine, and all of which impulses are transmitted in rapid succession. The code signal for the letter "E," for example, consists of a starting impulse or interval in which no current flows for 22 milliseconds; followed by one marking impulse or flow of current for 22 milliseconds; followed by four successive spacing impulses of 22 milliseconds each of no flow of current; followed by a stop impulse or current flow of 31 milliseconds' duration.

From an initial at rest condition in which all relays of the selector are de-energized, let it be assumed that the marking condition is received from an incoming circuit over conductors 13 and 14 by relay 10 causing energization thereof. This will cause the closing of normally open contacts 11, thereby completing a circuit from positive voltage potential P, through said closed contacts 11, conductor 3, normally closed contacts 23 of the de-energized relay 20, conductor 30d, normally closed contacts 33 of the de-energized relay 30, conductor 40d, normally closed contacts of de-energized relay 40, conductor 50d, normally closed contacts 53 of relay 50, conductor 60d, normally closed contacts 63 of relay 60, conductor 78, coil of relay 70 to ground. This causes energization of relay 70, whereupon normally closed contacts 71 open and normally open contacts 72 through 76 close. The closing of these latter contacts cause energization of relay 20, 30, 40, 50 and 60. The energizing circuit extends from positive voltage potential P, through contacts 72, conductor 20b, coil of relay 20, conductor 20a, to ground. Relays 30, 40, 50 and 60 are energized by similar circuits, as will be obvious from an examination of the drawing. At the same time, capacitors 28, 38, 48, 58 and 68 are charged, due to being connected in parallel with their associated relay coils.

When the start impulse or interval of no current flow is received by relay 10, relay 10 will be de-energized, contacts 11 will open, and the energizing circuit to relay 70 will be interrupted. However, relay 70 also has a "slow-to-release" characteristic, and is so adjusted as to release at the end of the start impulse or interval (22 milliseconds). At the end of this time relay 70 will release, causing normally closed contacts 71 to reclose, and normally open contacts 72 through 76 to reopen. The opening of contacts 72 will have the effect of interrupting voltage potential to relay 20, but the opening of contacts 73, 74, 75 and 76 will not have this effect upon relays 30, 40, 50 and 60, respectively, because a holding contact for each of these relays is completed through each preceding relay. That is to say, contacts 21 of relay 20 complete a circuit from positive voltage potential P, through conductor 30c, coil of relay 30, conductor 30a, to ground, causing relay 30 to remain energized. The closing of contacts 31 of relay 30 completes a circuit between positive voltage potential P and the coil of relay 40, to ground over a similar circuit, thereby energizing relay 40. Similar circuits hold relays 50 and 60. Therefore, the only relay of the chain which will be de-energized by the release of the relay 70 will be the first relay of the chain, or relay 20. However, due to its time delay characteristic of release caused by capacitor 28 discharging through relay coil 20, relay 20 will not actually release or open until the end of the first signal impulse (22 milliseconds). The first signal impulse received by relay 10 will close contacts 11, completing a circuit from positive potential P, through contacts 11, conductor 3, closed contacts 22 of relay 20 which has not yet been released, conductor 29, coil of magnet 25, to ground. Magnet 25 will then become energized, causing normally open contacts 26 to close.

Contacts 26 act as holding contacts for magnet 25 since a circuit will be completed from ground, through coil of magnet 25, contacts 26, resistor 27, conductor 79, normally closed contacts 71 of relay 70 which is now de-energized, to positive potential source P. Hence, magnet 25 will remain energized as long as relay 70 remains deenergized, irrespective of opening or releasing of relay 20.

At the end of the first signal impulse, relay 20 will release, as mentioned before, and contacts 21 and 22 will open and contacts 23 will close. The opening of contacts 21 will break the holding circuit energizing relay 30. However, due to the aforementioned discharging of condenser of this relay 30, it will remain energized until the end of the second intelligence impulse signal (22 milliseconds). The opening of contacts 22 will have no effect upon magnet 25 because of the aforementioned holding circuit that has been completed in connection with this magnet.

The closing of contacts 23 serve to shift the impulse signal to the second bank or magnet during the second intelligence impulse signal. In the case of the code for the letter "E," for example, the second impulse signal is "no current," so contacts 11 will not be closed during this period, and hence, magnet 35 will remain in a de-energized position. For some letter other than "E" whose code consists of a flow of current during the second intelligence interval, magnet 35 would be energized by a circuit completed from positive potential source P, through closed contacts 11, conductor 3, closed contacts 23, conductor 30d, closed contacts 32 since relay 30 does not de-energize until the end of this interval, conductor 39, coil of magnet 35, to ground. Upon operation of magnet 35, a holding circuit is completed from ground, through the coil, resistor 37, conductor 79, closed contact 71 to positive potential P.

At the end of the second intelligence interval relay 30 will finally release and contacts 31 and 32 will open and contacts 33 will close. In a manner similar to that described in connection with relay 20, the opening of contacts 31 will open a holding circuit to the next relay of the chain, that is, 40, but due to the slow release characteristic of this relay, it will not actually release until the end of the next intelligence impulse.

The opening of contacts 32 will have no effect upon magnet 35, since in the case of the code for letter "E" this magnet is not energized.

The closing of contacts 33 will serve to shift the next intelligence impulse to the succeeding magnet 45, if there is an impulse, from positive potential source P, through contacts 11, contacts 23, conductor 30d, contacts 33, conductor 40d, contacts 42, conductor 49, coil of magnet 45, to ground.

This series of operations is repeated until all five intelligence impulses or intervals have been completed, and all five magnets have been set, i.e., either locked in energized position or remaining de-energized. At the completion of the five intelligence intervals, relay 60 will release thus closing normally closed contacts 63. Since there is no succeeding magnet to which to shift the next signal which is the stop signal, contacts 63 complete a circuit from positive potential source P, through closed contacts 11, conductor 3, contacts 23, conductor 30d, contacts 33, conductor 40d, contacts 43, conductor 50d, contacts 53, conductor 60d, contacts 63, conductor 78, coil of relay 70, to ground. This causes energization of relay 70. Upon operation of relay 70, all of the relays of the chain are re-energized and the capacitors are re-charged, ready for a new code signal, due to closing of contacts 72 through 76, as at the outset of the cycle of operation.

The printing of the character or letter takes place at the beginning of the stop signal, all of the magnets being set in their distinctive positions for such character or letter. This function occurs in an apparatus (not shown) in conjunction with which the described selector operates, and is actuated by the opening of contact 61.

After relay 70 has become energized, normally closed contacts 71 open, thereby breaking the holding circuits for magnets 25, 35, 45, 55 and 65, and all five of these magnets are de-energized and released to normal position.

Upon energization of the chain of relays 20, 30, 40, 50 and 60 by the aforementioned closing of contacts 72 to 76 on relay 70, contacts 23, 33, 43, 53 and 63, of relays 20, 30, 40, 50 and 60, respectively, are opened, thus opening the energizing circuit to relay 70. However, this does not cause de-energization of relay 70, since there is a holding circuit connected therewith. This latter circuit extends from positive potential supply P, through closed contacts 11, resistor 12, conductor 15, conductor 78, coil of relay 70 to ground. Resistor 12 serves to limit the current that can pass in this circuit to a value which will hold relay 70 closed once it has been energized, but which is not great enough to cause it to operate from a de-energized or released position.

At the end of the stop impulse, relay 10 will de-energize and contacts 11 will break the holding circuit of relay 70, thus de-energizing this relay. Relay 70 also has a delayed release characteristic which is so adjusted that the relay will not release until the end of the start impulse, or interval, since this is an interval of no current. When this occurs, contacts 72 through 76 are opened and thus the energizing circuit to relay 20 is broken, and the entire cycle repeats itself. Release of relay 70 causes closing of normally closed contacts 71, thereby making it possible for magnet interlocking contacts 26, 36, 46, 56 and 66 to lock in their respective magnets, once these magnets are energized by the appropriate signal.

Figure 2:
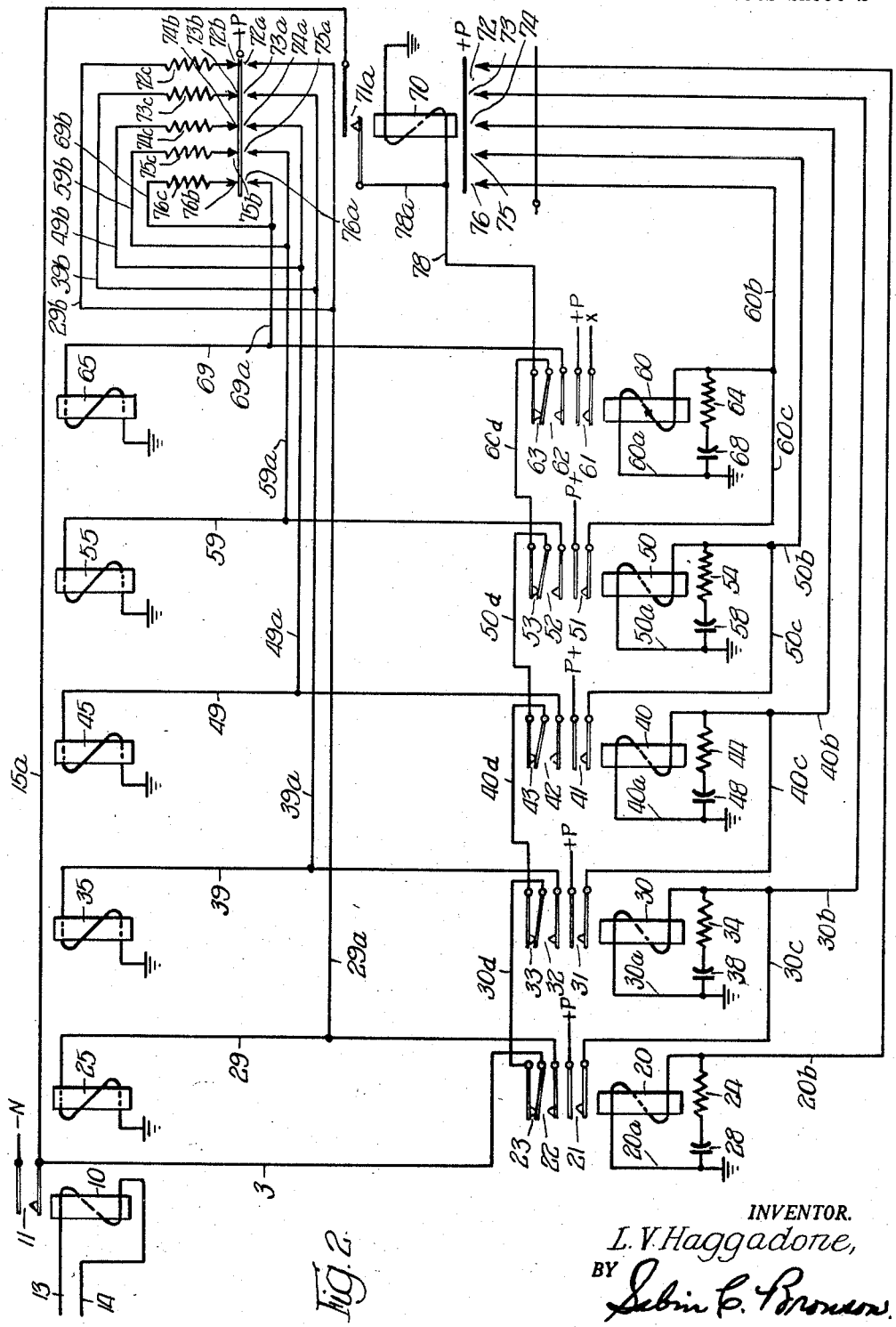

Figure 2 of the drawings shows a circuit diagram of a modification of the circuit described and shown in Figure 1. Identical components of the two circuits are identified by the same reference characters.

In the modification shown in Figure 2, normally open contacts 11 of relay 10 close a circuit to a negative source of voltage rather than a positive source of voltage, as described before. Furthermore, the magnets 25, 35, 45, 55 and 65 operate reversely from the previously described embodiment; that is, when contacts 11 of relay 10 are closed, the particular magnet connected to the circuit will de-energize or drop out rather than energize or pull in as before.

This is accomplished as follows:

On the stop impulse received over conductor 13 and 14, relay 10 will energize and contacts 11 will close. A circuit will be completed, as before, from a potential source (now negative), through contacts 11, conductor 3, closed relay contacts 23, 33, 43, 53 and 63, conductor 78, coil of relay 70, to ground. This will energize relay 70, which will pull in or operate and close, among others, contacts 71a, and contacts 72a through 76a. The closing of contacts 71a will close a holding circuit for relay 70, namely, from negative source of potential N, through contacts 11, conductor 15a, contacts 71a, conductor 78a, coil of relay 70, to ground. Hence, relay 70 will continue to remain energized after contacts of the initial energizing circuit open, as was explained before.

The closing of contacts 72a to 76a completes a circuit from positive potential source P, through contacts 72a, conductor 29a, conductor 29, coil of relay 25, to ground, thus causing magnet 25 to energize and operate. By similar circuits, magnets 35, 45, 55 and 65 are caused to be operated.

Upon termination of the stop impulse or signal, relay 10 will be de-energized, contacts 11 will open, and the holding circuit to relay 70 will be broken. Due to the aforementioned time delay in release, relay 70 will not actually release until the end of the start impulse, or interval of no current (22 milliseconds). At the end of the start interval when relay 70 releases, contacts 72b through 76b close and contacts 72a through 76a open. These contacts are characterized by a "make before break" feature, that is, contacts 72b through 76b must make or close before contacts 72a through 76a break or open.

When contacts 72b through 76b close, a circuit is completed from positive potential source P through contacts 72b, resistor 72c, conductor 29b, conductor 29a, conductor 29, coil of magnet 25, to ground. Due to resistance 72c in this circuit, a lower current now passes through the coil of magnet 25. The value of this current is such as to just hold the magnet energized. Magnets 35, 45, 55 and 65 are held energized by such lower current, by means of similar circuits, as is evident from the diagram of Figure 2.

When signal impulses are routed to the respective magnets in a manner as described in detail earlier, a negative potential from source N will be connected to the magnet. Being of opposite polarity to the holding potential already across the magnet the magnetizing force of the magnet will be cancelled, and the magnet will deenergize.

By using this arrangement, the incoming pulse may be badly distorted, but since it has no actual work to perform, it will still cause the magnet to de-energize, thereby resulting in greater sensitivity and operation over an extended distortion range.

In both embodiments of the selector described, the cycle of operation will be repeated for each coded signal representing a letter or character transmitted over conductors 13 and 14. When the relay 60 is released, opening contacts 61, a cicuit is interrupted from positive potential source P, through contacts 61, to conductor X which is connected to an impulse registering device and/or a tape feed device, or the like, such as is found on certain types of communication systems.

Although only two specific embodiments of the invention have been illustrated and described in detail, these are only to be taken as preferred examples thereof, and further variations and modifications may be made without departing from the spirit of this invention, or the scope of the subjoined claims.

Having thus described by invention, I claim:

1. An electrical communication receiving selector, comprising a chain of relays, an electromagnet connected with each relay of the chain, relay means operative in response to a signal impulse for operating all of the relays of the chain and releasing the first relay of the chain subsequent to the end of the signal impulse, contact means operated by each preceding relay of the chain for releasing in succession the succeeding relay of the chain, each relay of the chain having means connecting respective code signal impulses to each respective electromagnet, and means operated by each of the relays of the chain connecting said relay means for operation in response to the signal impulse preceding the next series of coded impulses.

2. In an electrical communication receiving selector, adapted to receive a series of coded impulses comprising a chain of relays, an electromagnet connected with each of said relays, relay means adapted to operate all of relays of the chain in response to a first impulse received by the selector, means for de-energizing said relay means at the termination of the first impulse, means controlled by said relay means for de-energizing the first relay of the chain at the termination of the next impulse, means operated by each of the relays of the chain to direct all impulses after said next impulse to the respective electromagnets of the associated relays of the chain to energize said electromagnets, means operated by each of the relays of the chain for successively de-energizing the succeeding relay of the chain, means operated by each of the relays of the chain serving to connect said relay means for operation in response to the signal impulse preceding the next series of code impulses to initiate a new cycle of operation, and contact means operated by said relay means for de-energizing all of the magnets upon operation of said relay means.

3. An electrical communication receiving selector comprising a chain of relays, an electromagnet connected with each of said relays, relay means adapted to operate all of the relays of the chain in response to the first impulse signal received by the selector, means controlled by said relay means for connecting operating potential to all of said magnets, means operated in response to said relay means for connecting holding potential all of said magnets, means controlled by said relay means for de-energizing the first relay of the chain, means operated by each of the relays of the chain to release each respective magnet in response to a respective coded signal impulse, means operated by each relay of the chain for successively de-energizing the succeeding relay of the chain, and means operated by each of the relays of the chain serving to connect said relay means for operation in response to the signal impulse preceding the next series of coded signal impulses.

4. An electrical communication receiving selector comprising a chain of relays having a slow to release characteristic, an electromagnet connected with each of said relays, relay means adapted to operate all of the relays of the chain in response to the first impulse signal received by the selector, means for de-energizing said relay means in response to the termination of the first impulse signal, means controlled by said relay means for de-energizing the first relay of the chain at the termination of a succeeding impulse signal, said slow to release characteristic of said first relay of the chain prolonging actual release thereof until the termination of the following impulse signal, means operated by each of the relays of the chain for directing all of the impulse signals after said succeeding impulse signal toward energization of the respective magnets, contact means operated by each preceding relay of the chain for successively de-energizing the suceeding relay of the chain, said slow to release characteristic of each of said relays prolonging actual release thereof for the equivalent of one signal impulse and after operation of said directing means, means associated with each of the relays of the chain serving to connect said relay means for operation in response to said first signal impulse, and means operated by said relay means for de-energizing all of the magnets upon said operation of all of relays of the chain.

5. An electrical communication receiving selector comprising a chain of relays having a slow to release characteristic, an electromagnet connected with each of said relays, relay means adapted to energize all of the relays of the chain in response to the first signal received by the selector, means for de-energizing said relay means in response to the termination of said signal, means controlled by said relay means for de-energizing the first relay of the chain at the termination of a succeeding signal, said slow to release characteristic of the chain relay prolonging actual release of the first relay of the chain until the termination of another signal, means connected with each of the relays of the chain for directing signals following said succeeding signal toward energization of the respective electromagnets, means operable in response to actuation of said magnets for maintaining said magnets energized after each connected chain relay is released, contact means operated by each preceding relay of the chain for successively de-energizing the succeeding relay of the chain, said slow to release characteristic of each relay prolonging actual release of each relay for the equivalent of one signal and after operation of said directing means, means operated by each of the relays of the chain serving to connect said relay means for operation in response to said first signal, and means operated by said relay means for de-energizing all of the magnets upon operation of said relay means.

6. An electrical communication receiving selector comprising a chain of relays, a variable resistance and capacitance combination connected with each relay for inducing a time delay in the release of the relay after de-energization thereof, the values of said resistance and capacitance components, being adjusted to introduce a delay in release equal in time to the duration of one signal pulse, an electromagnet connected with each relay of said chain of relays, relay means adapted to operate all of the relays of the chain in response to the first signal received by the selector, means for de-energizing said relay means in response to the termination of the first signal, means controlled by said relay means for de-energizing a succeeding relay of the chain in response to the termination of a succeeding signal, means associated with each of the relays of the chain for directing signals toward the energization of the respective magnets, means controlled by each magnet for maintaining each magnet energized after the associated relay is released, contact means operated by each preceding relay of the chain for successively de-energizing each succeeding relay of the chain, means associated with each of the relays of the chain serving to connect said relay means for operation in response to said first signal for a new cycle of operation.

7. An electrical communication receiving selector comprising a chain of relays having a slow to release characteristic, an electromagnet connected with each of said relays, relay means having a slow to release characteristic and adapted to operate all of the relays of the chain upon the first signal impulse being received by the selector, means for de-energizing said relay means in response to the termination of the first signal impulse, said slow to release characteristic prolonging actual release of said relay means until the termination of a succeeding signal impulse, means operated in response to the release of said relay means for de-energizing the first relay of the chain at the termination of said succeeding impulse signal, said slow to release characteristic of the chain relay prolonging the actual release thereof until the termination of another impulse signal, means operated by each of the relays of the chain for connecting other impulse signals to the respective magnets for energization thereof, means operable in response to actuation of each electromagnet for maintaining said electromagnet energized after the relay connected therewith is released, contact means operated by each preceding relay of the chain for successively de-energizing each succeeding relay of the chain, means operated by each of the relays of the chain serving to connect said relay means for operation in response to the first signal impulse of the next sequence to initiate a new cycle of operation, said last means being operable upon release of the last relay of the chain, and means operated by said relay means for de-energizing all of the magnets upon operation of said relay means.

8. An electrical communication receiving selector, comprising a chain of relays having a slow to release characteristic, an electromagnet connected with each of said relays, relay means adapted to operate all of the relays of the chain in response to a first signal received by the selector, means for connecting operating potential to all of said electromagnets while said relay means is de-energized, means operated in response to energization of said relay means for connecting holding potential to and disconnecting said operating potential from all of said electromagnets, means controlled by said relay means for de-energizing the first relay of the chain at the termination of another signal, said slow to release characteristic prolonging actual release thereof until the termination of a succeeding signal, means associated with each relay of the chain to control each respective electromagnet in response to respective signals, contact means operated by each preceding relay of the chain for successively de-energizing each succeeding relay of the chain, and means operated by each of the relays of the chain serving to connect said relay means for operation in response to the first signal of the next sequence, said last means being operable upon release of the last relay of the chain.

9. An electrical communication receiving selector comprising a chain of relays having a slow to release characteristic, an electromagnet associated with each of said relays, relay means having a slow to release characteristic and adapted to operate all of the relays of the chain in response to the receipt of a first signal by the selector, means for de-energizing said relay means in response to the termination of the first signal, said slow to release characteristic prolonging actual release thereof until the termination of a succeeding signal, means for connecting operating potential to all of the electromagnets while said relay means is energized, means operated in response to de-energization of said relay means for connecting holding potential and disconnecting said operating potential to all of said electromagnets, means controlled by the release of said relay means for de-energizing the first relay of the chain, said slow to release characteristic of the chain relay prolonging actual release thereof until the termination of another signal, means associated with each relay of the chain to release each respective magnet in response to respective signals, contact means operated by each preceding relay of the chain for de-energizing each succeeding relay of the chain in succession, and means associated with each of the relays of the chain serving to connect said relay means for operation in response to the first signal of the next sequence.

10. An electrical communication receiving selector comprising a chain of relays, an electromagnet connected with each of said relays, relay means adapted to operate all of the relays of the chain in response to the first signal impulse received by the selector, means for connecting operating potential to all of said electromagnets while said relay means is energized, means operated in response to release of said relay means for connecting a holding potential of like polarity and disconnecting said operating potential to all of said electromagnets, means controlled by said relay means for energizing the first relay of the chain upon the termination of a succeeding signal impulse, means operated by each relay of the chain for releasing each respective magnet in response to respective signal impulses by connecting thereto a potential of opposite polarity to the holding potential thereon, contact means operated by each preceding relay of the chain for successively de-energizing each succeeding relay of the chain in response to successive signal impulses, and means associated with each of the relays of the chain for operating said relay means in response to the first signal impulse of the next signal sequence.

11. An electrical communication receiving selector comprising a series of magnets arranged to be sequentially connected to successive impulses of a signal transmitted over an incoming circuit connected thereto, means operated in response to a predetermined impulse of the signal to register the position of the combination of the magnets, a relay associated with each of said magnets, each of said relays being connected in a chain, relay means operable in response to a first signal impulse, means controlled by said relay means for energizing all of the relays in said chain, means controlled by release of said relay means for de-energizing the first relay of the chain, contact means operated by each preceding relay of the chain for de-energizing the succeeding relay of the chain, further means associated with each relay of the chain for connecting a respective one of said successive impulses to each respective magnet prior to release of the relay, means associated with each of the relays of the chain serving to connect said relay means for operation in response to the first signal impulse of the succeeding signal sequence, and means controlled by said relay means to release all of the magnets, returning said magnets to normal position.

12. An electrical communication receiving selector comprising a series of magnets arranged to be sequentially connected to successive impulses of a signal transmitted over an incoming circuit connected thereto, means operated in response to a predetermined impulse of the signal to register the position of the combination of the magnets, a relay associated with each of said magnets, each of said relays being interconnected in a chain, relay means operable in response to a first signal impulse, means controlled by said relay means for energizing all of the relays in said chain, means controlled by release of said relay means for de-energizing the first relay of the chain, means associated with each relay of the chain for de-energizing the succeeding relay of the chain, further means associated with each relay of the chain for connecting a respective one of said successive impulses to each respective magnet prior to release of the associated relay, means associated with each of the relays of the chain serving to connect said relay means for operation in response to the first impulse of the next signal, said last means being operable upon release of the last relay of the chain, and means controlled by said relay means for placing all of the magnets in the condition of operation in which they were before being connected to said successive impulses.

References Cited in the file of this patent

UNITED STATES PATENTS

| | | |
|---|---|---|
| 1,957,672 | Saunders | May 8, 1934 |
| 2,400,574 | Rea | May 21, 1946 |
| 2,468,065 | Hartley | Apr. 26, 1949 |
| 2,590,926 | Boyer et al. | Apr. 1, 1952 |
| 2,626,314 | Coley | Jan. 20, 1953 |

OTHER REFERENCES

AIEE Technical Paper 51–350, Syst. 1951, by Oberman, Relay Chain etc. (Copy in 317/140.)